Sept. 7, 1948. J. T. CRANDALL 2,448,864
HARPOON CONSTRUCTION
Filed Oct. 4, 1943

Inventor:
Julian T. Crandall
By Nathaniel Frucht
Atty

Patented Sept. 7, 1948

2,448,864

UNITED STATES PATENT OFFICE 2,448,864

HARPOON CONSTRUCTION

Julian T. Crandall, Ashaway, R. I., assignor to Ashaway Line & Twine Mfg. Co., a corporation of Rhode Island Application October 4, 1943, Serial No. 504,969

3 Claims. (Cl. 43—6)

The present invention relates to fishing apparatus, and has particular reference to a novel construction for a harpoon tip.

The principal object of the invention is to provide a small harpoon tip which is of very light construction and is therefore suitable for use as emergency equipment for rafts and life boats, and for a soldier's or a hunter's pack.

Another object of the invention is to provide a harpoon tip which can be readily mounted on any available support, such as an oar, a pole, or a stick.

A further object is to provide a harpoon tip which has a support lock element as an integral part thereof.

With the above and other objects and advantageous features in view, the invention consists of a novel arrangement of parts more fully disclosed in the detailed description following, in conjunction with the accompanying drawings, and more specifically defined in the claims appended thereto.

It has been found desirable to provide a small, compact harpoon tip which takes up very little room, and is therefore suitable for use as part of the emergency equipment for a raft or a life boat, or for a soldier's or a hunter's pack. The novel harpoon tip is so constructed that it can be quickly and firmly mounted on any available support, such as an oar, a pole, or a stick, to thus provide a sturdy and effective harpoon. To this end, I have provided a novel harpoon tip which may be quickly attached to any suitable available support.

Figure 1:
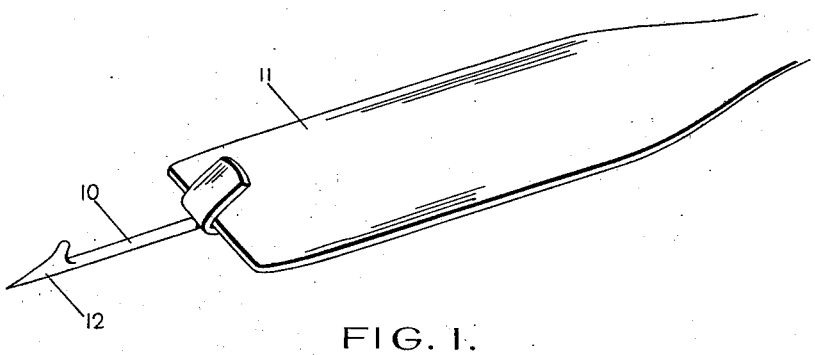
Fig. 1 is a perspective view showing the novel harpoon tip mounted on the end of an oar.
Figure 4:
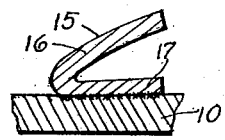
Fig. 4 is a central sectional detail through the harpoon tip body and the support securing device.
Figure 2:
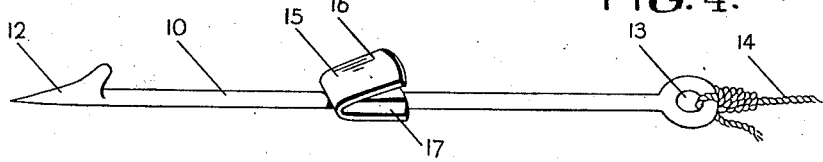
Fig. 2 is a perspective view of the harpoon tip, showing the details of construction thereof.

Referring to the drawings, the novel harpoon tip 10 is illustratively shown in Fig. 1 as mounted on an oar 11; the tip is made of metal, preferably in rod form, and is provided with an elongated body 10, an end hook 12 and a terminal eye 13 to which a length of fishing line 14 is secured. A support securing device 15 is illustratively shown as a V element having two obliquely inclined sides 16, 17, the side 17 being welded or otherwise secured to the body of the harpoon tip intermediate its ends. The V-shaped trough formed by the two slanting sides will accommodate a support in the form of an oar end, or a cut-away end of a pole or stick, the fishing line being preferably held in the hand when the harpoon is thrust, so that when the fish is struck the support releases from the tip, to thus avoid possibility of loss of the support, and the fish may then be hauled in by means of the line.

Figure 3:
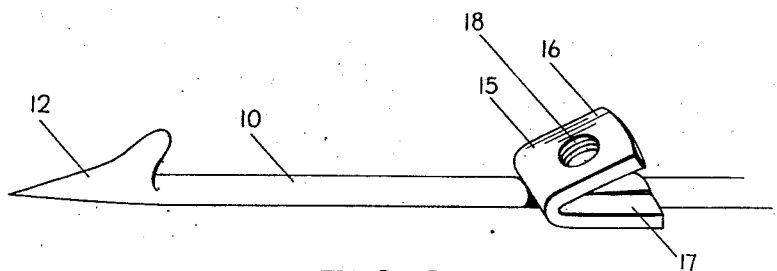
Fig. 3 is a fragmentary detail, similar to Fig. 2, and showing a modified construction of the support lock element.

The above described construction provides an effective emergency harpoon. If it be desired to provide a more permanent device, the tip may be locked to the support in a more permanent manner. Thus, at least the side 16 may be provided with an opening 18, see Fig. 3, which may be used for a nail or other securing means, or may preferably be threaded to receive a lock bolt for engagement with the support, to provide a permanent connection.

The described construction is thus a simple and effective device for providing a usable harpoon for emergency conditions, the device being small and light and therefore suitable for packing in an emergency kit for life rafts and life boats, or for inclusion in a portable pack.

While I have described illustrative embodiments of the invention, it is obvious that changes in the size, the form and shape, and the arrangement of the parts may be made to suit different harpoon tip requirements, without departing from the spirit and the scope of the invention as defined in the appended claims.

I claim:

1. A harpoon tip adapted to be mounted on the end of a support pole, comprising a rod having a hook at one end and a terminal eye at the other end, and a securing device having a base mounted on the rod intermediate the hook and eye and a retainer part cooperating with the base to form a trough for receiving the end of the support pole and holding the support pole adjacent to and in substantial alignment with the rod.

2. A harpoon tip adapted to be mounted on the end of a support pole, comprising a rod having a hook at one end and a terminal eye at the other end, and a securing device having a base plate mounted on the rod intermediate the hook and eye and a retainer plate cooperating with the base to form a trough for receiving the end of the support pole and holding the support pole adjacent to and in substantial alignment with the rod.

3. A harpoon tip adapted to be mounted on the end of a support pole, comprising a rod having a hook at one end and a terminal eye at the other end, and a securing device having a base plate mounted on the rod intermediate the hook and eye and a retainer plate cooperating with the base to form a trough for receiving the end of the support pole and holding the support pole adjacent to and in substantial alignment with the rod, said retainer plate having an opening for receiving a lock element adapted to engage the support pole end.

JULIAN T. CRANDALL.

REFERENCES CITED

The following references are of record in the file of this patent:

UNITED STATES PATENTS

| Number | Name | Date |
| --- | --- | --- |
| 35,746 | Roys | June 3, 1862 |
| 1,055,748 | Howse | Mar. 11, 1913 |
| 1,403,550 | Hinsdale | Jan. 17, 1922 |